Dec. 20, 1927.
G. L. N. MEYER
1,653,017
LUBRICATING APPARATUS
Filed April 25, 1924
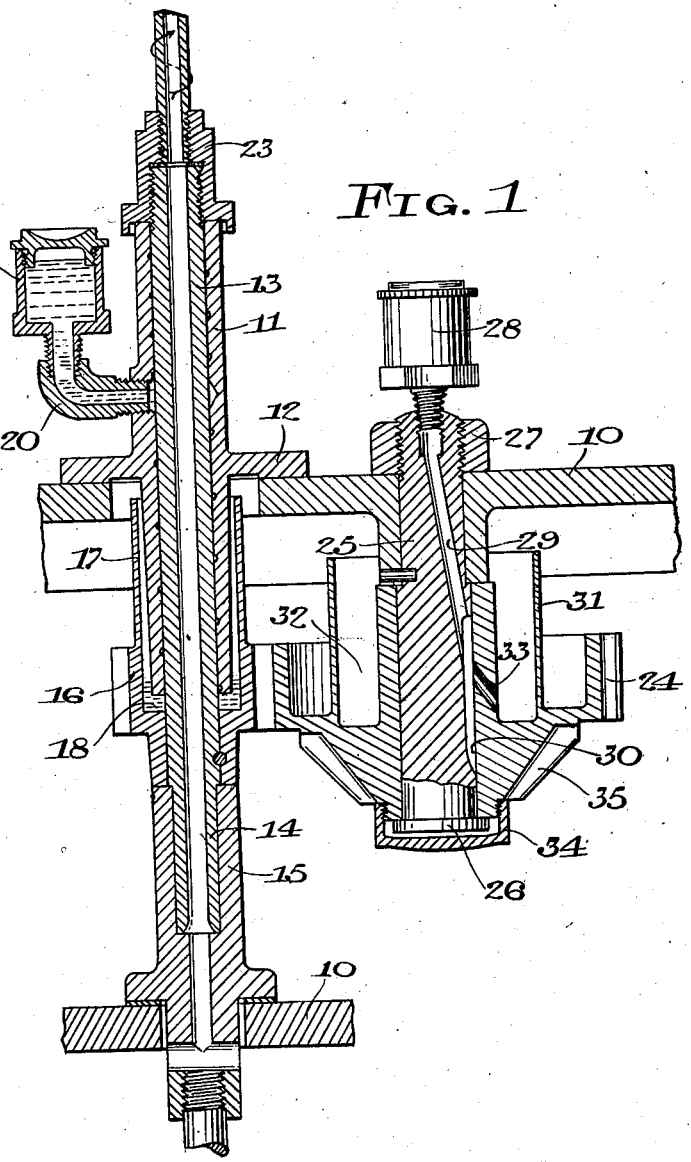
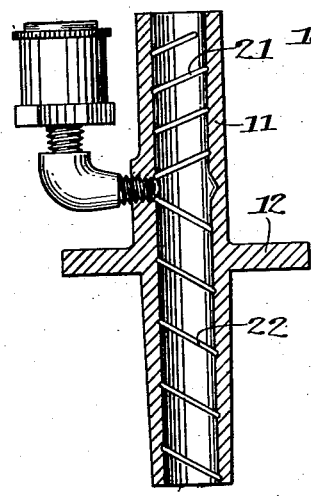

Patented Dec. 20, 1927.

1,653,017

UNITED STATES PATENT OFFICE.

GEORGE L. N. MEYER, OF MILWAUKEE, WISCONSIN, ASSIGNOR TO GEO. J. MEYER MANUFACTURING COMPANY, OF MILWAUKEE, WISCONSIN, A CORPORATION OF WISCONSIN.

LUBRICATING APPARATUS.

Application filed April 25, 1924. Serial No. 708,965.

The invention relates to lubricating apparatus, more particularly for the bearings of high speed vertical spindles.

The brush-carrying spindles employed in bottle washing machines, for washing the inside of bottles, rotate at a high speed and have a tendency to whip when in motion. To prevent such occurrence, long bearings are necessary, which have required frequent attention to keep properly lubricated throughout their length.

An object of the present invention is to provide means for lubricating the spindle and its companion driving member by which leakage of the lubricant is avoided and only infrequent attention is necessary for replenishing the lubricant.

Another object of the invention is to provide a vertical spindle bearing which is automatically lubricated throughout its length during the rotation of the spindle.

A further object of the invention is to provide a vertical spindle bearing with lubricating means including an oil reservoir fixed to a spindle which is journalled in the bearing and extends therebelow, whereby a leakage path is avoided to prevent loss of lubricant from the lower end of the reservoir, and thus permitting the provision of a sealed reservoir at an intermediate portion of the spindle.

The invention further consists in the several features hereinafter set forth and more particularly defined by claims at the conclusion hereof.

In the drawings: Fig. 1 is a vertical sectional view through a spindle drive embodying the invention; and Fig. 2 is a sectional view through the spindle bearing member.

In the drawings, the numeral 10 designates a vertically reciprocating frame on which a spindle bearing member 11 is mounted by an intermediate flange 12. A spindle 13 is journalled in the bearing member 11 and has its lower end 14 journalled in a female step bearing 15 secured to the lower part of the frame 10, this part being spaced from the upper part. In the present instance the spindle is hollow to receive a stream of water under pressure from the lower part of the frame, which forms a water chamber, the water serving to lubricate the step bearing.

A pinion 16 is secured to the spindle below the bearing member 11 and has an upwardly extending shell 17 surrounding the lower part of the bearing member to form an oil reservoir 18. For this purpose the pinion and shell are spaced from the end and sides of the bearing member and surround the major portion of the bearing member below its attaching flange.

Above the flange an oil cup 19 is connected to the bearing member by means of an elbow 20, and helical oil grooves 21 and 22 are formed in the bearing member above and below the oil opening, the two grooves being cut in opposite directions from the opening receiving the elbow and the upper one terminating short of the top of the bearing member. The reduced upper end of the spindle is connected to the lower end by a coupling member 23 engaging the top of the bearing member and rotatable thereon.

The spindle may be driven in any suitable manner but I have shown a gear 24 meshing with the pinion 16 and rotatably mounted on stationary pin 25 having a flanged lower end 26 supporting the gear and a reduced threaded upper end extending through the frame 10 and clamped thereto by a nut 27.

The pin 25 is provided at its upper end with an oil cup 28 similar to the oil cup 19 and an inclined bore 29 in the pin communicates therewith and with an oil groove 30 extending along the outside of the pin. The gear 24 is provided with a cup-like projection 31 extending upwardly above the bearing to form an oil reservoir 32 and a bore 33 forms a conduit between the reservoir and the bearing surface of stationary pin 25.

The lower end of the gear 24 is threaded to receive a cap 34 for preventing leakage of such oil as may find its way to the end of the bearing pin, and bevelled gear teeth 35 are provided for a driving connection with another shaft, not shown.

For lubricating the spindle bearing, a sufficient quantity of oil is poured into the oil cup 19 to fill it while the spindle is at rest, whereupon the oil will find its way through the helical oil groove 22 and into the reservoir 18 in the pinion 16, finally emptying the oil cup 19. Upon the rotation of the spindle in the direction indicated the oil is forced up through the helical groove 22 in the bearing member 11 and again fills the oil cup 19, thereby maintaining a head corresponding to the additional length of bearing surface above the oil opening in the bearing member. The oil pressure developed by the rotation of the spindle, however, is sufficient to enable the oil to reach the top of the spindle bearing, but leakage being prevented by the counter-pressure developed in the oil groove 21 which is formed in the opposite direction to the oil groove 22. The presence of oil in the filling reservoir 19, while the spindle is rotating, serves to indicate the proper functioning of the oiling system, and when the oil ceases to rise therein to the proper height during rotation, it will give notice of the need for additional oil in the lower reservoir 18. After the spindle comes to rest the oil again finds its way into the reservoir 18, where it remains until the further rotation of the spindle.

In some instances it may be desirable to form the helical oil grooves on the spindle instead of on the stationary bearing member, with suitable provision for continuous communication with the filling reservoir as the spindle rotates. The functioning, however, remains the same as that explained above.

The reservoir 32 of the gear 24 is filled with oil through the oil cup 28 at the top of the stationary bearing pin 25, and the head of oil in the reservoir makes it possible to effectively lubricate all parts of the bearing. The outer wall of the oil reservoir in both the pinion 16 and the gear 24 extends upwardly to a height sufficient to prevent any loss of oil over the upper edge while the spindle is being rotated.

The invention provides a simple but effective way of lubricating all parts of a long spindle bearing with no loss of lubricant by leakage and requiring infrequent attention for replenishing the lubricant. The provision of a rotating reservoir secured directly to the spindle permits the reservoir to be placed and effectively sealed against leakage at an intermediate portion of the spindle in cases where the spindle projects downwardly from the bearing for any distance.

What I claim as new and desire to secure by Letters Patent is:

1. The combination with a vertically-disposed bearing member having a rotatable member carried thereby, an oil reservoir surrounding the lower end of said bearing member, a filling reservoir directly communicating with said rotatable member at a point intermediate the ends of said bearing member and forming a standpipe for lubricating the upper portion of said bearing member, the bearing surface between said members having a helical oil groove communicating with said reservoirs, whereby oil is conducted by gravity from the filling reservoir to the lower reservoir while the rotatable member is at rest, and forced from said lower reservoir along said bearing surface and into said filling reservoir by the rotation of said spindle, and the bearing surface between said members having an oppositely directed helical oil groove above said filling reservoir and communicating therewith, whereby leakage of oil is prevented from the upper end of the bearing, the pressure-induced head of oil in said filling reservoir extending substantially to the upper end of the bearing to insure lubrication of the upper portion of the bearing.

2. The combination, with a vertically disposed bearing member and a rotatable vertical spindle member carried thereby, of means for supplying and forcing oil upwardly along the bearing surfaces from the lower end of said bearing member, means for preventing leakage of oil from the upper end of said bearing member, and a reservoir connected to said bearing member at an intermediate portion to receive oil forced upwardly along the bearing member and extending substantially to the upper end of said bearing member to form an oil-supplying standpipe for the upper portion of said bearing member.

In testimony whereof, I affix my signature.

GEORGE L. N. MEYER.